United States Patent [19]

Webster

[11] 4,390,141

[45] Jun. 28, 1983

[54] STRAP WINDING MECHANISM

[76] Inventor: Jerald H. Webster, 11200 Des Moines Way, S., Seattle, Wash. 98168

[21] Appl. No.: 266,633

[22] Filed: May 26, 1981

[51] Int. Cl.³ .................... B65H 17/46; B65H 75/40
[52] U.S. Cl. ................................ 242/86.5 R; 242/106
[58] Field of Search .............. 242/86.5 R, 86.52, 86.2, 242/85, 67.1 R, 96, 106, 76

[56] References Cited

U.S. PATENT DOCUMENTS

| | | | |
|---|---|---|---|
| 498,307 | 5/1893 | Rule | 242/86.5 R |
| 2,811,321 | 10/1957 | La Barre | 242/86.52 |
| 3,478,980 | 11/1969 | Raasch | 242/86.52 |
| 3,827,650 | 8/1974 | Stevens | 242/86.5 R |
| 4,007,887 | 2/1977 | Vice | 242/86.5 R |
| 4,266,740 | 5/1981 | Ramos et al. | 242/86.52 |
| 4,311,288 | 1/1982 | Galland | 242/86.5 R |

Primary Examiner—Leonard D. Christian
Attorney, Agent, or Firm—John O. Graybeal

[57] ABSTRACT

A strap winding mechanism for the winding of truck load straps and the like, in the form of an L-shaped frame having first and second legs in right angle relation with the first leg being demountably clamped in an upright position to any selected stake hole of a conventional flat bed truck so that the second leg extends horizontally from the truck bed. Intermediate the ends of the second leg, a strap reel handle and strap reel assembly are journaled for relative engagement during the winding operation.

A strap guide is arranged at the outboard end of the second leg for guiding the strap onto the reel. The strap reel handle and strap reel assembly may be interchanged in position or removed, and the strap guide may be attached to extend from either side of the second leg or completely removed, for ease of use and convenient storage.

9 Claims, 3 Drawing Figures

STRAP WINDING MECHANISM

DESCRIPTION

1. Technical Field

The present invention relates to a device for the rolling of elongate strapping or the like and in particular to a strap winding mechanism for the rolling of truck load straps or the like.

2. Background Art

U.S. Pat. No. 498,307, granted to Rule, discloses a reeling device attachable to upper and lower edges of the side of a wagon for the winding and unwinding of wire. This mechanism does not provide flexibility of use or ease of storage in that its reel shaft and crank are integral and journalled in a fixed yoke so that any material on the reel is not readily removable as a wound unit. Moreover, any given attitude of the Rule yoke and reel with respect to mounting brackets of the device is obtained by rotation of the yoke with respect to the brackets, and as shown on page 2 of Rule, lines 9-10, the yoke and reel must be "guided" controlled and steadied by means of the handle 30".

U.S. Pat. No. 4,007,887, granted to Vice, discloses a strap rolling device consisting of a crank handle and reel spindle which are separable from a supporting frame. The supporting frame is in turn separable from a truck bed mounting bracket. Though this structure permits disengagement of the wound material from the reel spindle, the disengagement can only take place once the reel spindle and crank handle have been taken from the supporting frame, allowing the roll of material to drop from the frame member. Each time it is desired to remove a roll of material from the reel spindle, the crank handle and reel spindle must be removed completely from the mechanism. In addition, the crank handle cannot be interchanged between opposing sides of the support frame and the device is not arrangeable in a plurality of stake holes to allow for possible obstructions to the use of the device. Also, the disclosed embodiment of this device requires the permanent attachment of mounting brackets to the truck bed for the device even though it may be used only occasionally.

U.S. Pat. No. 3,827,650, granted to Stevens et al, discloses a cable storage means which consists of a spring loaded drum assembly mounted on the bangboard of a truck. While appropriate for the winding of cables for which it is intended, this spring loaded drum is too unwieldy for use in winding conventional load straps or the like. The load straps would also need to be furnished with attachments to be compatible with the spring-loaded function of the Stevens device.

Two different types of truck tarpaulin reels are shown by U.S. Pat. No. 3,478,980, granted to Raasch, and U.S. Pat. No. 2,811,321, granted to La Barre.

DISCLOSURE OF THE INVENTION

It is an object and feature of the present invention to provide a windup reel device for truck load strapping and the like which uses a base clamping feature on an L-shaped frame for the mounting of the frame in any selected stake hole of a conventional truck bed, and also provides for easy demounting and disassembly of the L-shaped frame for storage. Any unobstructed stake hole can be chosen for the mounting of the frame, obviating the need for special mounting brackets.

It is another object and feature of this invention to provide a reel device which is convenient and adaptable in that, through opposite sides of the stanchion, a reel assembly and reel handle can be engaged for mutual rotation and later disengaged so that the positions of the reel assembly and handle can be interchanged, and so that the reel handle and reel assembly may be removed for storage.

Another object of the invention is to provide a strap winding mechanism which can be positioned to avoid ground or load obstructions to the operation of the mechanism. The invention therefore features an L-shaped frame with a first leg of the frame demountably attachable to a stake hole in a substantially vertical attitude with respect to the truck bed and with a second leg of the frame fixed to the first and standing horizontally away from the truck bed so that ground or load obstructions to the operation of a strap reel journaled in the second leg are avoided.

As a further feature of the present invention, the dimension of the device between its base clamp and the reel spindle, is preferably of sufficient length (e.g. about nine to sixteen inches) to permit longer lengths of strapping to be coiled on the reel than is possible with conventional strap reels journaled at the side of the truck bed.

An additional feature provided is an open-ended bifurcated load strap guide which permits ready guiding of the strap from a position on the ground, for instance, to the strap reel assembly for proper winding.

An additional feature provided is an open-ended bifurcated reel assembly which permits ready axial separation of the material roll from the reel assembly without dismantling any portion of the device.

BRIEF DESCRIPTION OF THE DRAWINGS

In the drawings, like element designations refer to like parts throughout, and.

BEST MODE OF THE PRESENT INVENTION

Figure 1:
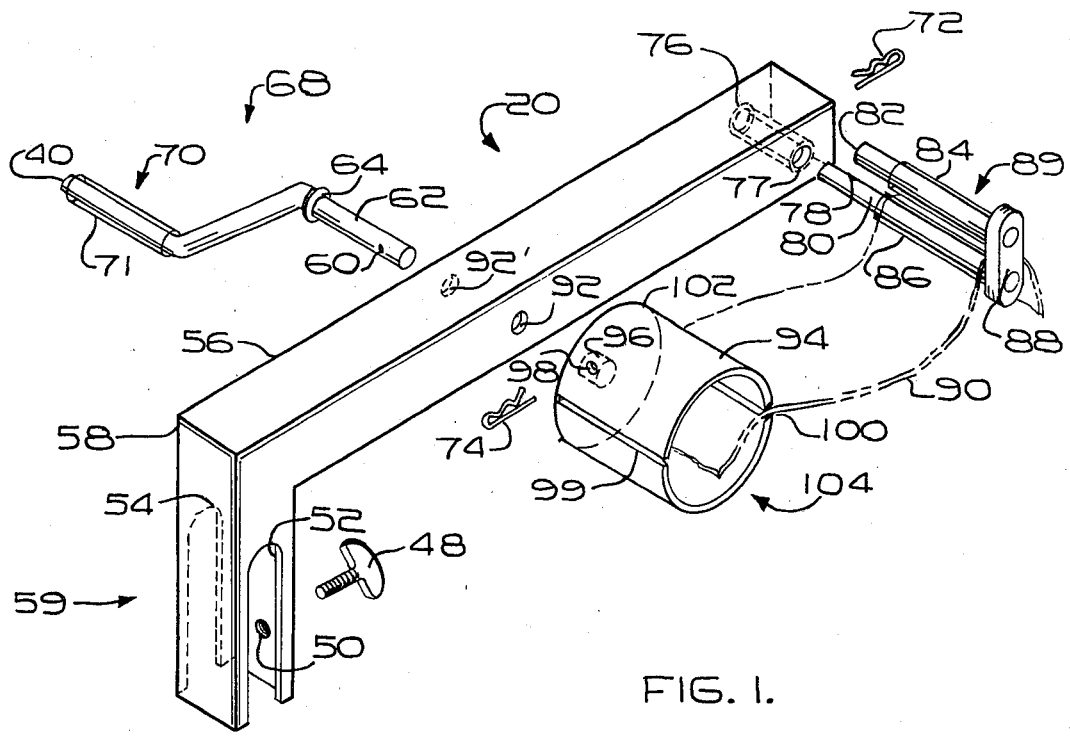
FIG. 1 is an exploded view of the strap winding mechanism showing, in phantom, a load strap partially rolled thereon.

Shown in FIG. 1 is an L-shaped frame 20 for the positioning and mounting of the strap winding mechanism in the stake holes of a conventional truck bed. Although it is anticipated that other materials would serve as well, the L-shaped frame 20 in the present embodiment comprises two welded segments of rectangular steel conduit, with the first segment shown as a first leg 58 of the frame 20 and the second segment shown as a second leg 56 of the L-shaped frame 20. The first leg 58 has a clamping mechanism 59 which in turn comprises two open-ended rectangular slots 52 and 54 and a thumb screw 48 which is threaded for engagement with the complementary threaded aperture 50. In a manner hereinafter described, the clamping mechanism 59 securely mounts the frame 20 to any selected stake hole at the edge of a truck bed.

Journal apertures 92 and 92' are located on opposite sides of the leg 56 approximately intermediate the ends of leg 56. These journal apertures 92 and 92' receive the shaft 62 of the reel handle 68. Reel handle 68 additionally comprises a circular retainer 64 and a handle portion 70. The circular retainer 64 fixed to the terminus of the shaft 62 keeps the entire handle 68 from moving too far into the apertures 92 and 92'. A plastic rotatable sheath 71 may enclose a grip 40 of the handle portion 70 so that friction between the user's hand and the grip 40 is reduced.

A strap reel assembly 104 is located on the opposite side of leg 56 from reel handle 68. The strip reel assembly 104 is comprised of a hub collar 96 centered upon a hub plate 102 and fixed to the hub plate 102 is an open-ended cylinder 94 with strap slots 99 and 100. As can be seen in FIG. 1, the strap reel assembly 104 is demountably engaged with reel handle 68 by the insertion of shaft 62 through the apertures 92 and 92' into collar 96. When pin aperture 98 of collar 96 is aligned with pin aperture 60 of shaft 62, a pin 74 may be inserted to obtain a demountable engagement of reel handle 68 with strap reel assembly 104.

Figure 3:
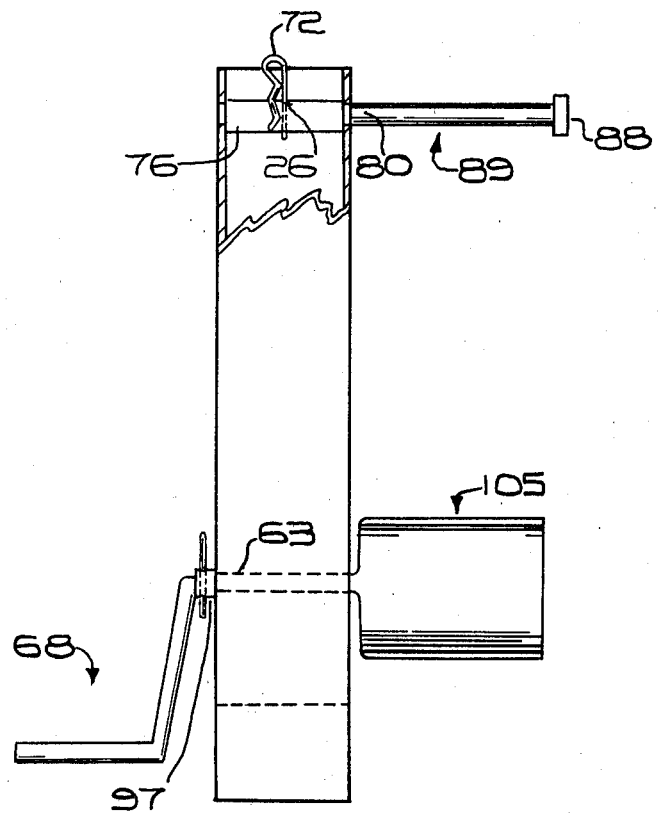
FIG. 3 is a plan view, partially broken away, showing a means of attachment for the strap guide and an alternate embodiment of the strap reel assembly.

Proximate the end of leg 56, opposite the clamping mechanism 59, the leg 56 has an aperture 77 with a collar 76 fixed therein. Collar 76 receives for demountable engagement a first guide bar 80 of strap guide 89. Strap guide 89 additionally comprises a second guide bar 82 and a strap stop 88 which fixes both first and second guide bars 80 and 82 in a substantially parallel relation, with enough clearance therebetween for passage of a strap. Guide bar 80 is suitably detachably retained in collar 76 by pin 72 inserted in hole 26 in collar 76 and hole 78 in bar 80 (FIG. 3). Strap guide 89 is thus completely removable or movable to the opposite side of first leg 56.

Figure 2:
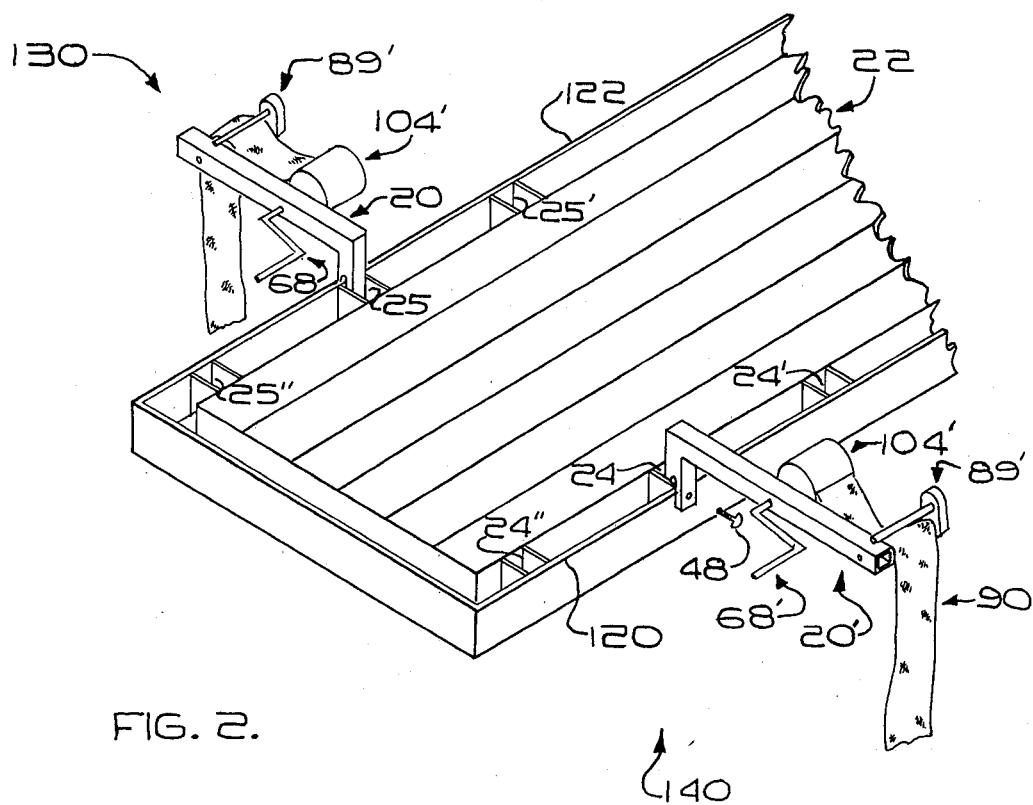
FIG. 2 is a perspective view of a truck bed provided with conventional stake holes showing specifically the method of attachment and use of the strap winding mechanism.

FIG. 2 shows a conventional truck bed 22 having exterior side rails 120 and 122 and having stake holes 24, 24' and 24" on one side of truck bed 22 and stake holes 25, 25' and 25" on the opposite side of truck bed 22. Two of the strap winding mechanisms 140 and 130 of this invention are shown securely yet demountably attached to the respective stake holes 24 and 25. The first strap winding mechanism 140 has a frame 20' and contained thereon, a reel handle 68', a strap reel assembly 104' and a strap guide 89'. This mechanism 140 is engaged with the stake hole 24 so that the leg 58 straddles the outer rail 120 on either side of the rectangular slots 52 and 54 as shown in FIG. 1. The user of the mechanism turns the thumb screw 48 through the threaded bolt aperture 50, as in FIG. 1, until the side rail 120 is securely gripped between the thumb screw 48 and that portion of the frame leg 58 within the stake hole 24. The user can then commence to roll any truck load strap or the like onto the strap reel assembly 104'. To do so, the load strap is first inserted between the guide bars 80 and 82 of strap guide 89. The guide bars 80 and 82 as shown in FIG. 1 may have respective rotatable plastic sheats 86 and 84 which will serve to reduce friction between the strapping 90 and guide 89. The strap 90 is brought through the slots 99 and 100 as shown in FIG. 1. The handle 68 is then turned by the user to roll the strap 90 upon the cylinder 94. The cylinder 94 is attached to the hub 102 and engaged for mutual rotation with the shaft 62 of reel handle 68. The handle 68 is rotated by the user until the strapping material or the like is wound to the extent necessary. Because the cylinder 94 has an inside diameter large enough to accommodate at least a portion of the user's hand, the user can merely slide the coiled strap roll axially from the cylinder 94.

Figure 4:
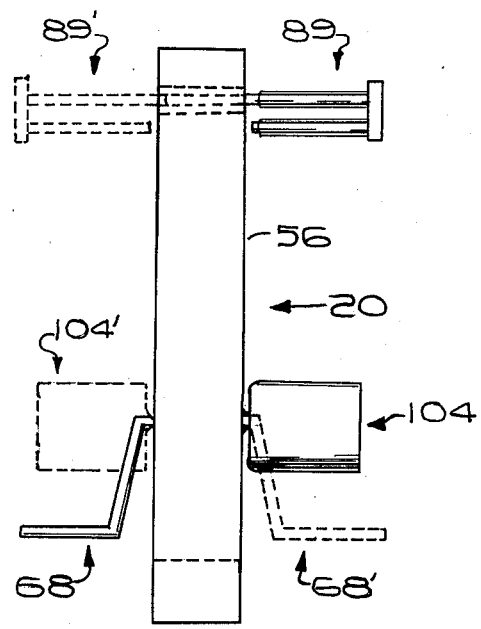
FIG. 4 is a plan view showing the mechanism with the reel handle, strap reel assembly and strap guide journaled in respective apertures and showing the flexibility of the mechanism wherein the reel handle, reel assembly and strap guide are shown in phantom in reversed attitude.

A strap reeling mechanism 120 of FIG. 2 is shown engaged with stake hole 25 of truck bed 22. This strap reeling mechanism 130 has a reel handle 68, a strap reel assembly 104 and a strap guide 89, all mounted on frame 20 which is in turn clamped into stake hole 25. The mounting of strap reeling mechanism 130 illustrates the flexibility of the present invention in that the handle 68, strap reel 104 and strap guide 89 have all been interchanged from the respective positions of handle 68', strap reel 104' and guide 89' upon frame 20'. FIG. 2 illustrates the interchangeability of all the parts upon the frame and thus illustrates the flexibility of the mechanism with respect to the arrangement of its components. Just as they can be interchanged, all the parts 89, 104 and 68 can be completely removed from convenient storage. FIG. 4 illustrates this same flexibility wherein the positions of the parts 89, 104 and 68 may be interchanged upon the leg 56 for the positions shown by parts 89', 104' and 68'.

FIG. 3 shows a modified form of reel mounting wherein the strap reel assembly 105 is fixedly attached to the shaft 63 and the reel handle 68 has a hub collar 97 for receiving shaft 63 and for demountable engagement with the same.

Figure 5:
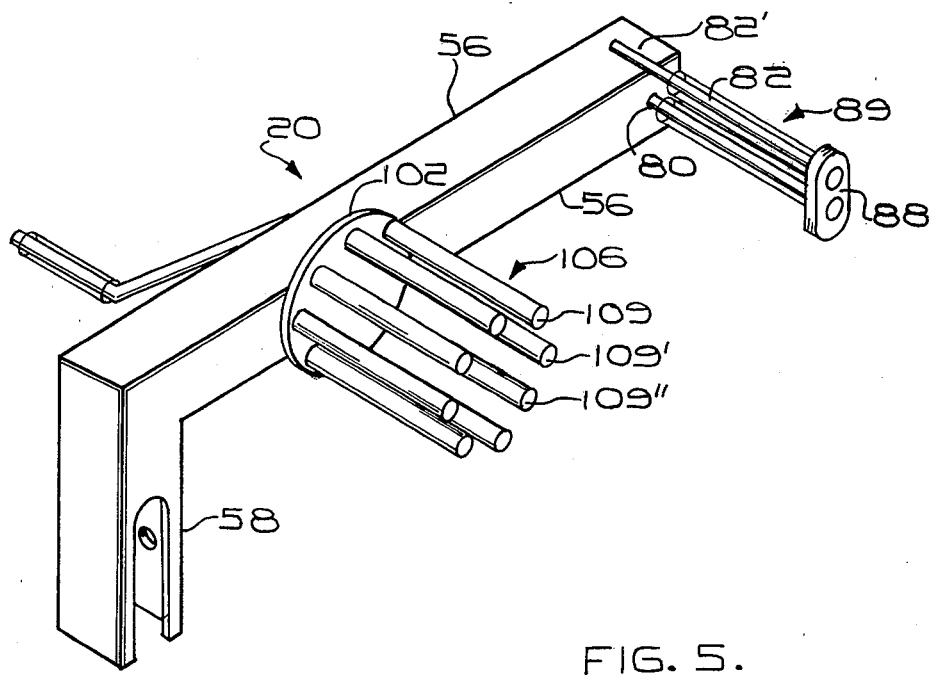
FIG. 5 is a perspective view showing an alternate embodiment of the strap reel assembly and strap guide.

FIG. 5 shows an additional embodiment of the strap reel assembly of the invention. In this embodiment strap reel assembly 106 comprises hub plate 102 having a plurality of parallel rods 109, 109' and 109" extending therefrom. The rods 109, 109' and 109" are fixed to hub plate 102 in equispaced relation about the axis of rotation of hub 102 so that the rods collectively provide a reel or drum for the convenient winding of the strap thereon and so that a plurality of positions are provided for the insertion of the strap end between adjacent rods prior to winding. The inside diameter of the cylindrical rod pattern is preferably of a size so that the user's hand and fingers can readily be inserted to extract rolled strapping axially therefrom.

FIG. 5 additionally discloses a modified strap guide arrangement wherein a top guide bar 82 comprises an extension 82' onto and abutting leg 56 of frame 20 to provide an extra measure of stability to the strap guide 89.

Other adaptations, modifications and variations of the present invention will be apparent to those skilled in the art in view of the foregoing typical and therefore non-limitative examples thereof, within the scope of the following claims.

What is claimed is:

1. A strap winding mechanism for use in connection with a conventional flat bed truck or the like provided with stake holes or the like along the sides thereof,
   a substantially L-shaped frame having a first leg which is detachably clamped at its outer end to any selected stake hole of said truck bed;
   said frame when so mounted including a second leg standing out from said first leg horizontally away from said truck bed;

said second leg having therethrough a first journal aperture arranged with its axis generally parallel to said truck bed;

a strap reel assembly comprising a reel hub and, extending therefrom, an open-ended cylindrical section on which the strap is windable and from which wound strapping is readily removable by withdrawal from the open end of such section;

a reel handle including means for detachable connection thereof to said strap reel assembly with said reel handle and said strap reel assembly arranged in said journal aperture on respectively opposite sides of said second leg, the said means for detachable connection of said reel handle to said strap reel assembly enabling ready assembly and disassembly of the reel handle, strap reel assembly and frame for storage of the mechanism when not in use.

2. The mechanism of claim 1, wherein said reel assembly and said reel handle are reversibly arrangeable in said journal aperture.

3. The device of claim 1, wherein said open-ended cylindrical section is comprised of a plurality of rods, each substantially parallel to the next and each rod fixed at generally right angles to said hub such that said plurality of rods forms a cylindrical section upon said hub.

4. The device of claim 1, wherein said open-ended cylindrical section is comprised of an open-ended substantially bifurcated tube.

5. The device of claim 1, further comprising: an open-ended bifurcated strap guide mounted near the end of said cantilevered frame opposite from the clamped end thereof, for guiding the strap onto said strap reel assembly during winding of the strap thereon.

6. The device of claim 5, further comprising means detachably mounting said strap guide on said frame.

7. The device of claim 6, wherein:

the strap guide detachable mounting comprises a second journal aperture extending substantially parallel to said first journal aperture; and shaft means placeable in said second journal aperture.

8. The device of claim 5, wherein said strap guide comprises spaced parallel rods.

9. The device of claim 7, wherein said reel assembly and reel handle, and said strap guide, are each reversibly arrangeable in the respective first and second journal apertures.

* * * * *